United States Patent [19]
Agrawal et al.

[11] Patent Number: 5,878,413
[45] Date of Patent: *Mar. 2, 1999

[54] SYSTEM AND METHOD FOR DEFINING SHAPES WITH WHICH TO MINE TIME SEQUENCES IN COMPUTERIZED DATABASES

[75] Inventors: Rakesh Agrawal, San Jose, Calif.; Giuseppe Psaila, Dalmine, Italy; Edward L. Wimmers, San Jose; Mohamed Zait, Campbell, both of Calif.

[73] Assignee: International Business Machines Corporation, Armonk, N.Y.

[*] Notice: The term of this patent shall not extend beyond the expiration date of Pat. No. 5,737,593.

[21] Appl. No.: 947,227

[22] Filed: Oct. 8, 1997

Related U.S. Application Data

[62] Division of Ser. No. 459,018, Jun. 2, 1995, Pat. No. 5,737,593.

[51] Int. Cl.$^6$ ........................................ G06F 17/30
[52] U.S. Cl. .................... 707/6; 382/181; 382/187; 382/188; 382/189; 707/6; 707/7
[58] Field of Search ................................. 707/6, 516, 7; 382/181, 187, 188, 189; 704/2

[56] References Cited

U.S. PATENT DOCUMENTS

| | | | |
|---|---|---|---|
| 4,110,736 | 8/1978 | Kono | 340/146 |
| 4,644,585 | 2/1987 | Crimmins et al. | 382/48 |
| 5,164,996 | 11/1992 | Pastor | 382/25 |
| 5,452,371 | 9/1995 | Bozinivic et al. | 382/187 |
| 5,509,087 | 4/1996 | Nagamine | 282/188 |
| 5,517,578 | 5/1996 | Altman et al. | 282/181 |
| 5,544,260 | 8/1996 | Chefalas et al. | 382/187 |
| 5,550,931 | 8/1996 | Bellegarde et al. | 382/187 |

OTHER PUBLICATIONS

Berndt, et al., "Using Dynamic Time warping to Find Patterns in Time Series", *KDD–94: AAAI Workshop on Knowledge Discovery in Databases*, pp. 359–370, Seattle, Washington, Jul. 1994.

N. H. Gehani, et al., "Composite Event Specification in Active Databases: Model & Implementation", *Proceedings of the VLDB Conference*, pp. 327–338, Vancouver, British Columbia, Canada, Aug. 1992.

Rakesh Agrawal, et al., "Database Mining: A Performance Perspective", *IEEE Transactions on Knowledge and Data Engineering*, 5(6):914–925, Dec. 1993.

Praveen Seshadri, et al., "SEQ: A framework for Sequence Databases", Computer Sciences department, pp. 1–24, University of Wisconsin–Madison, WI 52706, U.S.A., no date.

(List continued on next page.)

*Primary Examiner*—Thomas G. Black
*Assistant Examiner*—Jean M. Corrielus
*Attorney, Agent, or Firm*—Gray Cary Ware Freidenrich

[57] ABSTRACT

A system and method including a computer shape definition language are disclosed for defining shapes and mining time sequences that resemble the shapes. The system and method include provisions for establishing a user-defined alphabet that in turn establishes a set of elemental shapes. The system also includes simple yet powerful operators for combining the elemental shapes to define a desired time sequence shape. Moreover, intervals of actual time sequences are mapped into corresponding transition sequences using the alphabet, and the transition sequences are stored in a hierarchical index structure for easily accessing the transition sequences. The index structure is entered with the desired time sequence shape, and the index structure is traversed to identify maximal actual transition sequences which conform to the desired time sequence shape, within user-definable blurry criteria.

32 Claims, 7 Drawing Sheets

OTHER PUBLICATIONS

Praveen Seshadri, et al., "Sequence Query Processing", Computer Sciences Department, pp. 1–12, University of Wisconsin–Madison, WI 53706, U.S.A., no date.

Rakesh Agrawal, et al., "An Interval Classifier for Database Mining Applications", *Proceedings of the 18th VLDB Conference*, pp. 1–14, Vancouver, British Columbia, Canada, 1992.

Andrea Califano, et al., "FLASH: A Fast Look–up Algorithm for String Homology", *Proceedings of the 1st International Conference on Intelligent Systems for Molecular Biology*, pp. 353–359, Bethesda, MD, Jul. 1993.

S. Chakravarthy, et al., "Composite Events for Active Databases: Semantics, Contexts, and Detection", *Preceedings of the VLDB Conference*, pp. 606–617, Santiago, Chile, Sep. 1994. (QA76.9D3.I559 1992).

J. T. Wang, et al. "Combinatorial Pattern Discovery for Scientific Data: Some Preliminary Results", Proceedings of the *ACM SIGMOD Conference on Management of Data*, pp. 115–125, Minneapolis, May 1994.

Sellis, et al., "The $R^+$ Tree: A Dynamic Index for Multi–Dimensional Objects", 1987 Proceedings 13th International Conference on VLDB, pp. 507–518, England, 1987. (QA76.9.D3 I559).

S. Wu, et al., "Fast Text Searching", Communications of the ACM, pp. 83–91, vol. 35, No. 10, Oct. 1992.

Martin Vingron and Patrick Argos, "A Fast and Sensitive Multiple Sequence Alignment Algorithm", *Computer Applications in the Biosciences*, 5:115–122, 1989. (W1.C0528.BML 1st & 2nd Fl.).

M.A. Roytberg, "A Search For Common Patterns in Many Sequences", *Computer Applications in the Biosciences*, 8(i):57–64, 1992.

S.Gatziu and K.R. Dittrich, "Detecting Composite Events in Active Databases Using Petri Nets", *Proceedings of the 4th International Workshop on Research Issues in Data engineering: Active Database Systems*, pp. 2–9, Feb. 1994. (QA76.9D3.I593 1993).

IBM Database 2 Application Programming Guide for Common Servers, Version 2, pp. 275–304 (1995).

Montage User's Guide, pp. 8–1 through 8–5 (Mar. 1994).

| Symbol | Description | ib | ub | iv | fv |
|---|---|---|---|---|---|
| up | slightly increasing transition | .05 | .19 | anyvalue | anyvalue |
| Up | highly increasing transition | .20 | 1.0 | anyvalue | anyvalue |
| down | slightly decreasing transition | -.19 | -.05 | anyvalue | anyvalue |
| Down | highly decreasing transition | -1.0 | -.19 | anyvalue | anyvalue |
| appears | transition from a zero value to a non-zero value | 0 | 1.0 | zero | nonzero |
| disappears | transition from a non-zero value to a zero value | -1.0 | 0 | nonzero | zero |
| stable | the final value nearly equal to the initial value | -.04 | .04 | anyvalue | anyvalue |
| zero | both the initial and final values are zero | 0 | 0 | zero | zero |

FIG. 4: *An Illustrative Alphabet A*

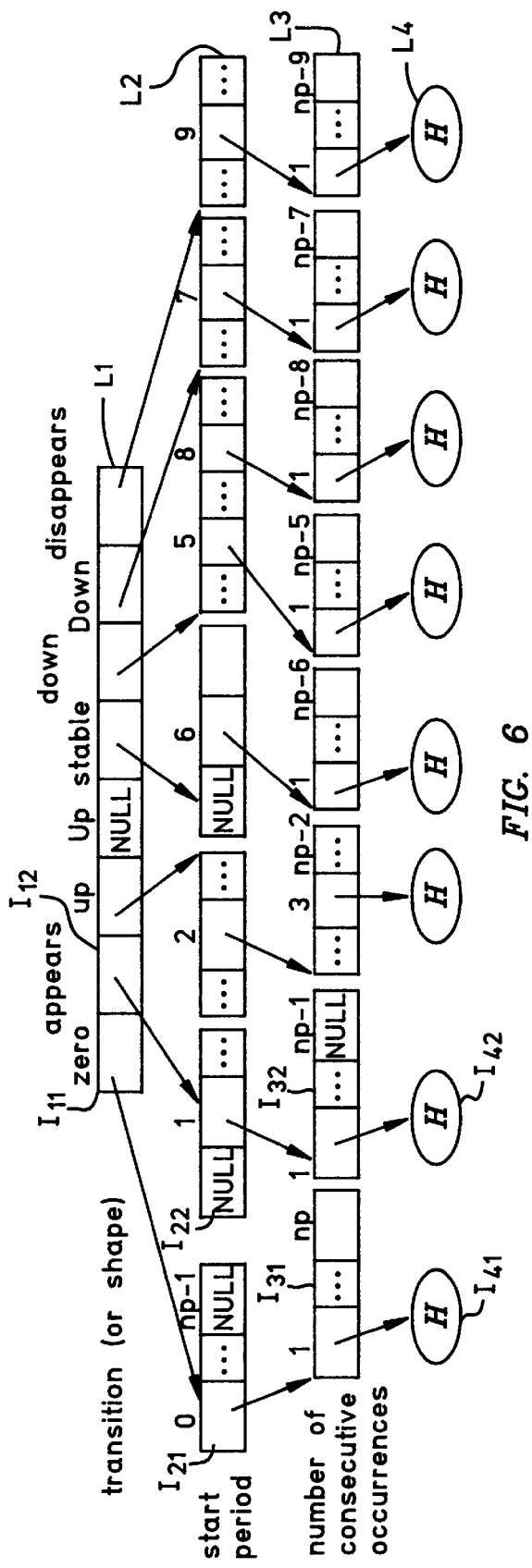

FIG. 6

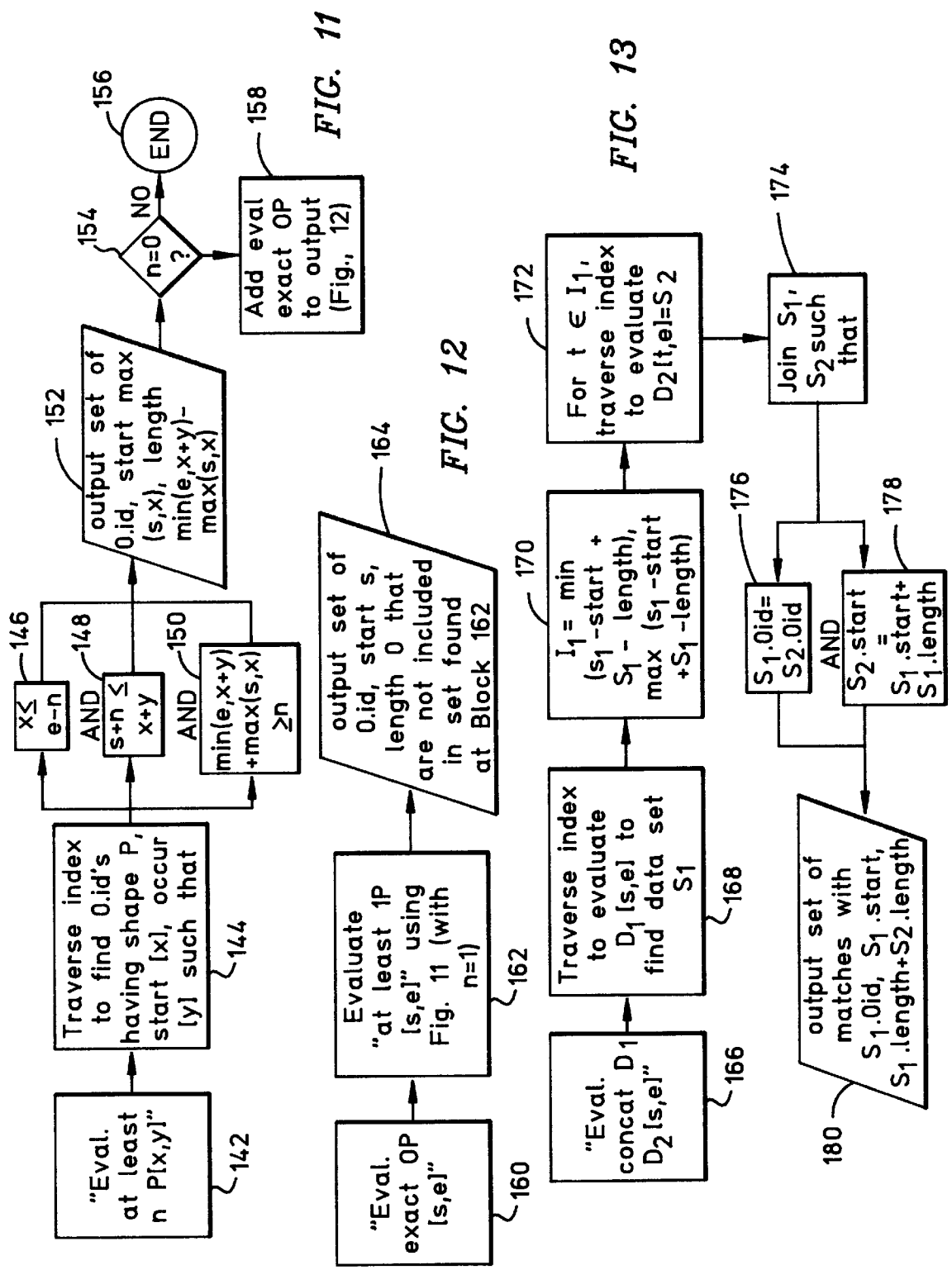

SYSTEM AND METHOD FOR DEFINING SHAPES WITH WHICH TO MINE TIME SEQUENCES IN COMPUTERIZED DATABASES

This application is a division of application Ser. No. 08/459,018, filed Jun. 2, 1995, now issued as U.S. Pat. No. 5,737,593.

BACKGROUND OF THE INVENTION

1. Field of the Invention

The present invention relates generally to data processing, and more particularly to "mining" of computerized databases in which a user can analyze database contents to discern particular shapes of time sequences for retrieval. In particular, the invention concerns a shape definition language for mining subsequences of time sequences that are stored in a computerized database, wherein the subsequences have user-defined shapes.

Relatedly, J. T. Wang et al. in "Combinatorial Pattern Discovery for Scientific Data: Some Preliminary Results," *Proc. of the ACM SIGMOD Conference on Management of Data* (5/94), have defined the mining of a database as "the activity of finding structural or topological patterns in data that can lead to important conclusions or prediction of new phenomena." In this application one such topological pattern is imposed by time; the invention has been made to obtain this pattern from a computerized database.

2. Description of the Related Art

Sequences of events over time, hereinafter "time sequences", often are implicit in the contents of databases, making them accessible to computers for a number of advantageous purposes. As recognized by the present invention, computers can provide a vehicle to define particular patterns of interest in such time sequences. These patterns can be graphically depicted in, e.g., Cartesian coordinates, with the y-axis representing a magnitude, for example, a stock price, and the x-axis representing time, such that the pattern established by the time sequence is characterized by a shape. Although the above example assumes time histories that have tuples that map to (or imply) two dimensions for the purposes of explaining what is meant by "shape", the principles of the present invention can be applied to time histories that have tuples that map to "n" dimensions. It is the purpose of the present invention to provide a means for a user to define a desired time history shape, and then to access an index of actual time histories to retrieve from contents of a database subsequences of time sequences which conform to the defined shape.

The ability to define a desired time history shape and then identify actual time sequences that conform to the shape has many applications in science, industry, and business. As but one example, it might be desirable to identify stocks whose closing price, when plotted in Cartesian coordinates against time, resembles a head-and-shoulder shape. As another example, it might be desirable to identify user-defined time sequences in product sales patterns, or to identify predefined patterns in time sequences in seismic waves for identifying geological irregularities. As recognized by the present invention, it is often desirable to match a time sequence to a predefined shape despite the time sequence not exactly matching the shape. Such matches are referred to herein as "blurry" matches.

Database languages and models have been introduced for identifying time sequences having particular attributes, but such languages and models have several drawbacks which it is the intent of the present invention to address. An example of a database language for specifying composite events in databases is disclosed in Gehani et al., "Composite Event Specification in Active Databases: Model and Implementation", *Proc. of the VLDB Conf.*, pp. 327–338, Vancouver, 1992. The language disclosed in Gehani et al. uses finite automatons and, hence, regular expressions. Consequently, the language of Gehani et al. is somewhat cumbersome in effecting blurry matches, because it requires the generation and merging of many automatons to express the desired blurry shape. Furthermore, the Gehani et al. language focusses on finding the endpoints of predefined events, rather than identifying time sequence intervals that conform to a predefined shape.

A time sequence pattern detection algorithm is disclosed in Berndt et al., "Using Dynamic Time Warping to Find Patterns in Time Series", *KDD-94: AAAI Workshop on Knowledge Discovery in Databases*, pp. 359–370, Seattle, 1994. Unfortunately, the Berndt et al. algorithm does not provide the capability to impose arbitrary conditions on blurry matches. Still further, previous algorithms such as the Berndt et al. algorithm which use regular expressions tend to identify time sequences that are essentially duplicative of each other, and hence generate much of what might be termed unnecessary clutter.

More particularly, time sequence detection techniques that use regular expressions tend to return both maximal subsequences (i.e., subsequences that are not proper subsequences of other shape-matching subsequences), as well as non-maximal subsequences that are largely overlapping, and in many applications the non-maximal subsequences represent useless data clutter. Additionally, previous time sequence detection techniques in general do not automatically rewrite user shape queries as comparatively more efficient alternate expressions. And, previous time sequence detection techniques do not reconfigure databases for efficient examination of the time sequences in response to user queries.

Accordingly, it is an object of the present invention to provide a system and method for matching time sequences in databases to predefined shapes that enable a user to express the desired shapes simply, naturally, and powerfully.

Another object of the present invention is to provide a system and method for matching time sequences in database contents to predefined shapes which allow for imposing arbitrary conditions on blurry matches.

Yet another object of the present invention is to provide a system and method for matching time sequences in database contents to predefined shapes which return only maximal subsequences that match a predefined shape.

Still another object of the present invention is to provide a system and method for matching time sequences in databases contents to predefined shapes with ease of use, efficiency, and cost-effectiveness.

SUMMARY OF THE INVENTION

The invention concerns a shape definition language with which a user can define desired shapes of time sequences in computerized databases and then identify subsequences of the time sequences which conform to the desired shape.

This invention is realized in a critical machine component that causes a digital processing apparatus to perform method steps for identifying subsequences of time sequences that conform to user-defined desired shapes. Hereinafter, the machine component is referred to as a "computer program product".

In accordance with the present invention, the method steps include defining a set of elemental shapes, preferably in terms of a plurality of user-defined parameters, referred to herein as an "alphabet". The method steps also include defining a desired time sequence shape using the elemental shapes or combinations thereof. Intervals of at least one time sequence are mapped to corresponding transition sequences. In this regard, a transition sequence is defined in terms of an elemental shape or shapes which describe respective intervals. An interval may be described by more than one transition sequence. Next, sets of transition sequences that match the desired time sequence shape are identified. Parameter values which are representative of transition sequences that match the desired time sequence shape are output.

Several advantageous features for use in the preferred embodiment are disclosed. One such feature is that a transition sequence is identified as matching the desired time sequence shape when the transition sequence satisfies user-defined blurry criteria. Also preferably, the output is maximal. Stated differently, parameters representative of a transition sequence that matches the desired time sequence shape are output only when the transition sequence is not a proper subset of another transition sequence that matches the desired time sequence shape.

As further intended by the presently preferred embodiment, the desired time sequence shape is defined in a computer system by a user using a first expression. The first expression is then rewritten in terms of a second expression relatively more efficient than the first. Still further, to conserve electronic storage space and to quickly identify transition sequences that match the user-define desired shape (i.e., to speed up query processing), the transition sequences are stored in a hierarchical index structure. Sets of transition sequences that match the desired time sequence shape are identified by accessing the index structure.

In accordance with principles disclosed herein, the index structure includes first, second, third, and fourth levels arranged in a hierarchy and having a plurality of instances, and instances in the first level are indexed to elemental shapes. Also, each instance in the first level points to an instance in the second level, and each instance in the second level is a data array indexed by the start period of the first occurrence of the elemental shape. Moreover, each instance in the second level points to an instance in the third level, and each instance in the third level is a data array indexed to a maximum number of times the corresponding elemental shape appears consecutively. Each instance of the third level points to at least one, and generally a plurality of, instances in the fourth level which are representative of respective transition sequences.

With respect to the blurry matching of the present invention, the blurry-defined criteria can be defined by establishing a first number of consecutive transition sequences that must contain precisely a second number of at least one elemental shape. Also, the blurry-defined criteria can be defined by establishing a first number of consecutive transition sequences that must contain no less than a second number of at least one elemental shape. Still further, the blurry-defined criteria can be defined by establishing a first number of consecutive transition sequences that must contain no more than a second number of at least one elemental shape. Moreover, the blurry-defined criteria can be defined by establishing a desired time sequence length in which at least a first elemental shape follows in order at least a second elemental shape.

If desired, the user may define the desired time sequence shape in a computer system in terms of two or more elemental shapes. For example, the desired time sequence shape can be characterized by a concatenation of any two or more elemental shapes. Alternatively or in addition, the desired time sequence shape can be defined as being characterized by an exact user-defined number of contiguous non-overlapping occurrences of one or more elemental shapes. Also, the desired time sequence shape can be defined as being characterized by no less than a user-defined number of contiguous non-overlapping occurrences of one or more elemental shapes. Moreover, the desired time sequence shape can be defined as being characterized by no more than a user-defined number of contiguous non-overlapping occurrences of one or more elemental shapes.

In another aspect of the present invention, a computer program product is disclosed which is readable by a digital processing apparatus and which tangibly embodies a computer program. The computer program product combines a computer readable medium with program code elements having computer readable language means for matching a time sequence with a user-defined shape, the computer readable language means including computer readable code means for defining a plurality of elemental shapes, each elemental shape being characterized by a plurality of user-defined attributes. Also provided are computer readable code means for defining a desired time sequence shape in terms of the elemental shapes or combinations thereof. Still further, computer readable code means are provided for identifying transition sequences that match the desired time sequence shape in accordance with user-defined blurry criteria. Additionally, computer readable code means are provided for outputting parameters representative of transition sequences that match the desired time sequence shape.

In yet another aspect of the present invention, a system for mining a database is disclosed for outputting electronically stored time sequences that satisfy user-defined time sequence shape criteria. The system includes a shape generator for defining a desired shape in terms of one or more user-defined elemental shapes. Further, the system includes a mapping device for defining a time sequence in terms of the user-defined elemental shapes. Still further, a query executor is operably associated with the mapping device and shape generator for determining whether at least a portion of the time sequence matches the desired shape. An output device outputs the portion of the time sequence when the portion of the time sequence matches the desired shape.

In another aspect, a computer-based system for time sequence mining includes an elemental shape definer and a mapping element operably associated with the elemental shape definer for mapping intervals of time sequences to transition sequences. A multi-level hierarchical index structure is accessible by the computer for storing the transition sequences, and a shape generator is operably associated with the elemental shape definer for defining a desired shape in terms of one or more user-defined elemental shapes. As disclosed in detail below, a query executor accesses the index structure and is operably associated with the shape generator for determining whether at least portions of the time sequences match the desired shape.

The details of the present invention, both as to its structure and operation, can best be understood in reference to the accompanying drawings, in which like reference numerals refer to like parts, and in which:

BRIEF DESCRIPTION OF THE PREFERRED EMBODIMENTS

FIG. 4 is a table showing an illustrative alphabet of the present invention;

FIG. 6 is a schematic diagram of the hierarchical index structure of the present invention;

Figure 7A:
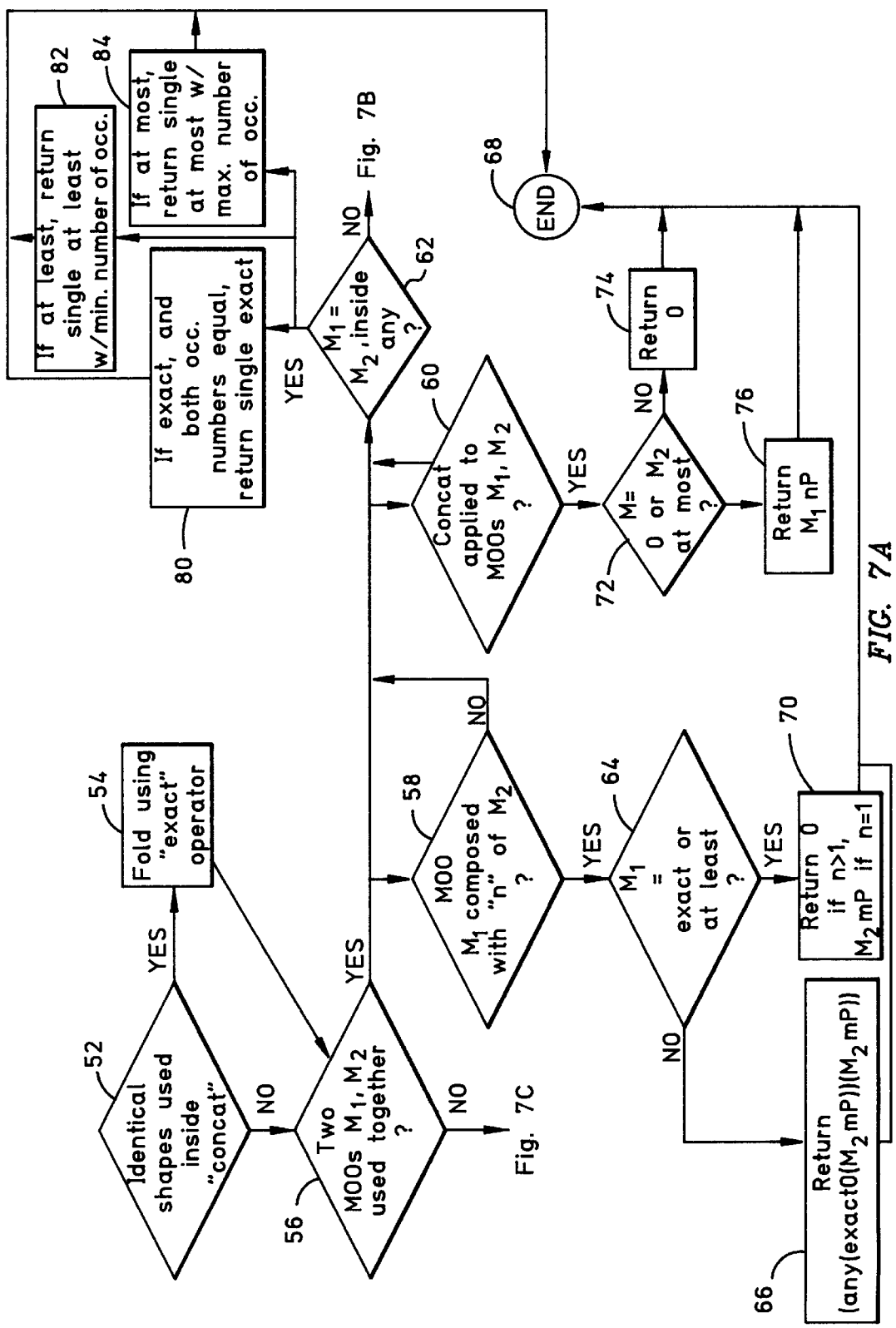
Figure 7B:
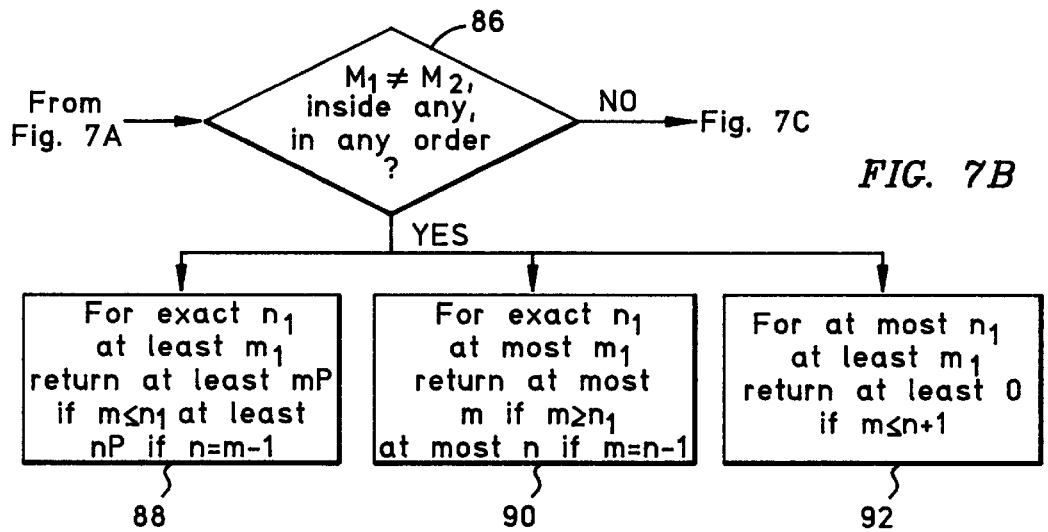
Figure 7C:
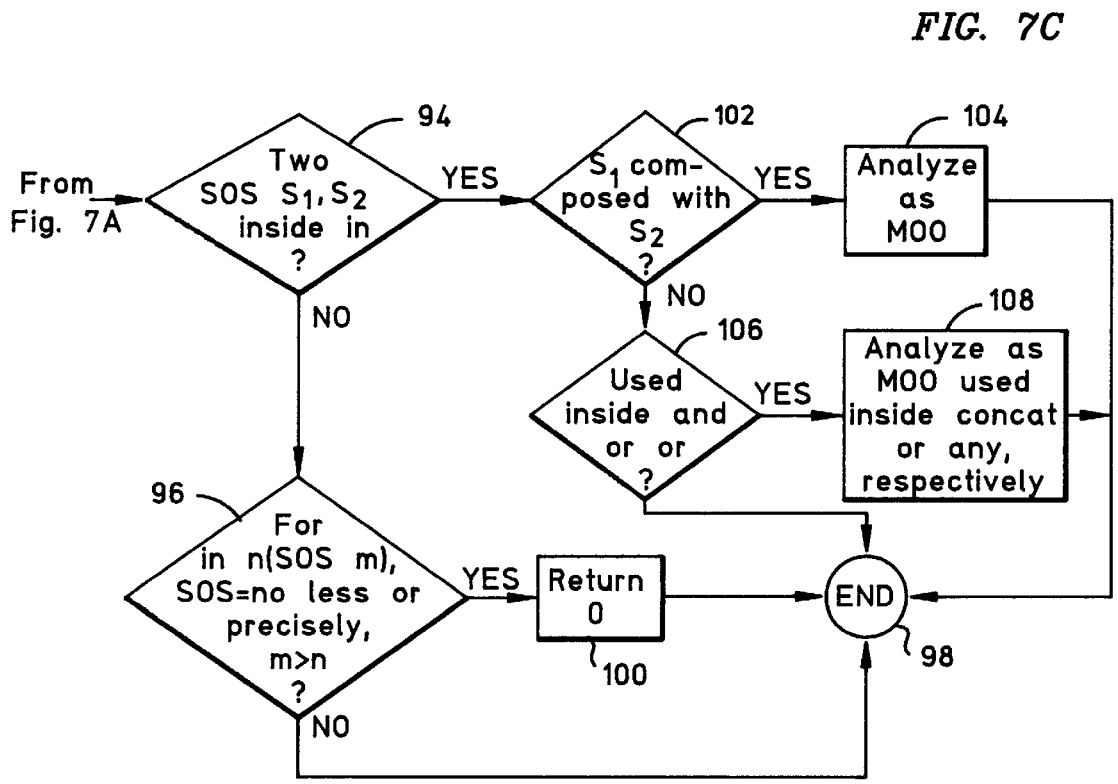
Figure 8:
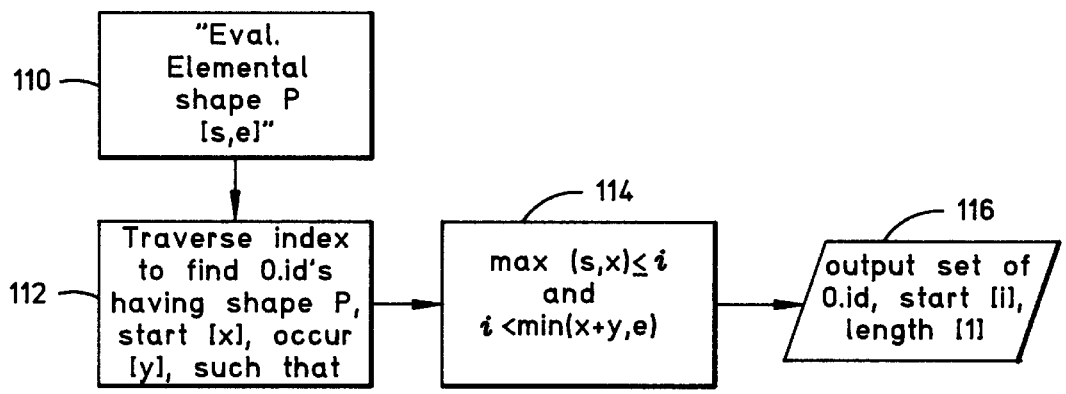
Figure 9:
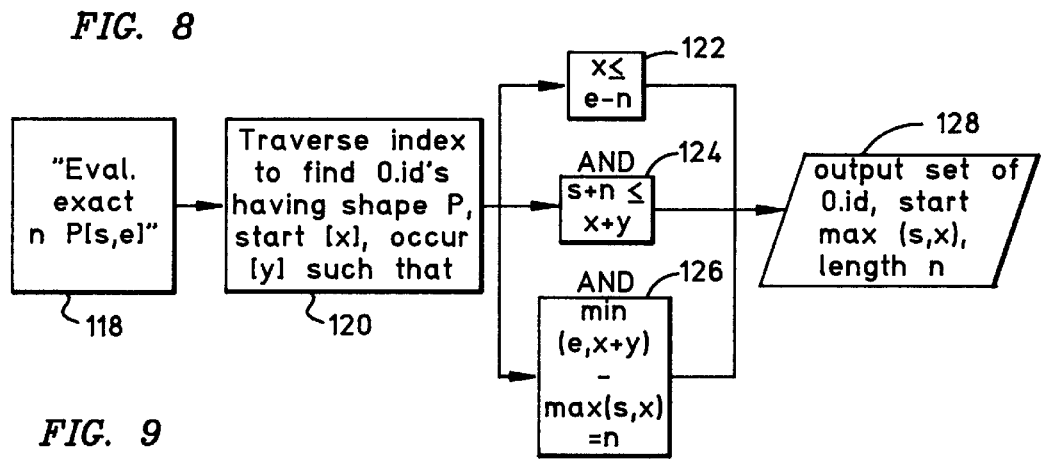
Figure 10:
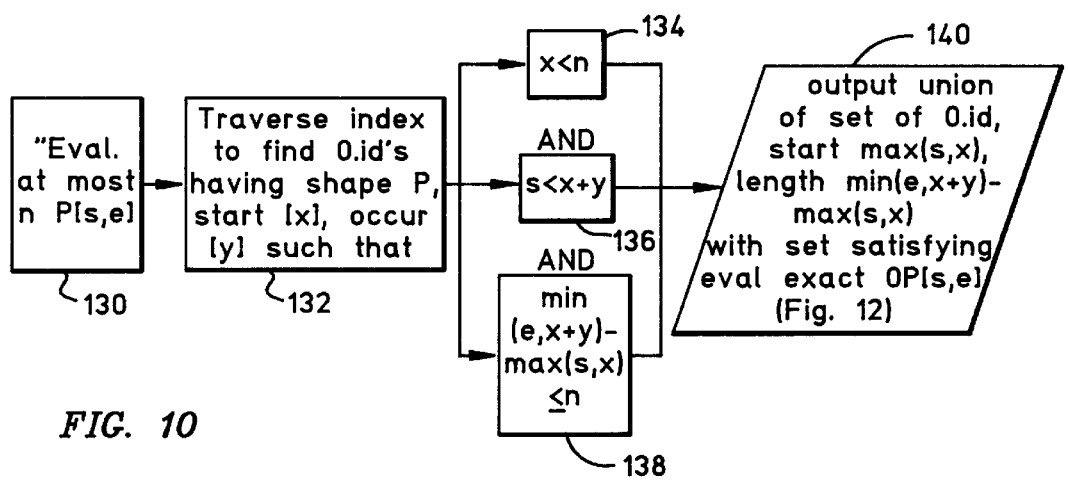

FIGS. 7A, 7B, & 7C are flow charts of the automatic query rewriting steps of the present invention;

FIG. 8 is a flow chart showing the operation of the query executor of the present invention in evaluating a query for an elemental shape;

FIG. 9 is a flow chart showing the operation of the query executor of the present invention in evaluating a query for an exact shape;

FIG. 10 is a flow chart showing the operation of the query executor of the present invention in evaluating a query for an atmost shape;

FIG. 11 is a flow chart showing the operation of the query executor of the present invention in evaluating a query for an atleast shape;

FIG. 12 is a flow chart showing the operation of the query executor of the present invention in evaluating a query for an elemental shape having exactly zero occurrences; and FIG. 13 is a flow chart showing the operation of the query executor of the present invention in evaluating a query for a concatenation of two shapes.

DETAILED DESCRIPTION OF THE PREFERRED EMBODIMENTS

Figure 1:
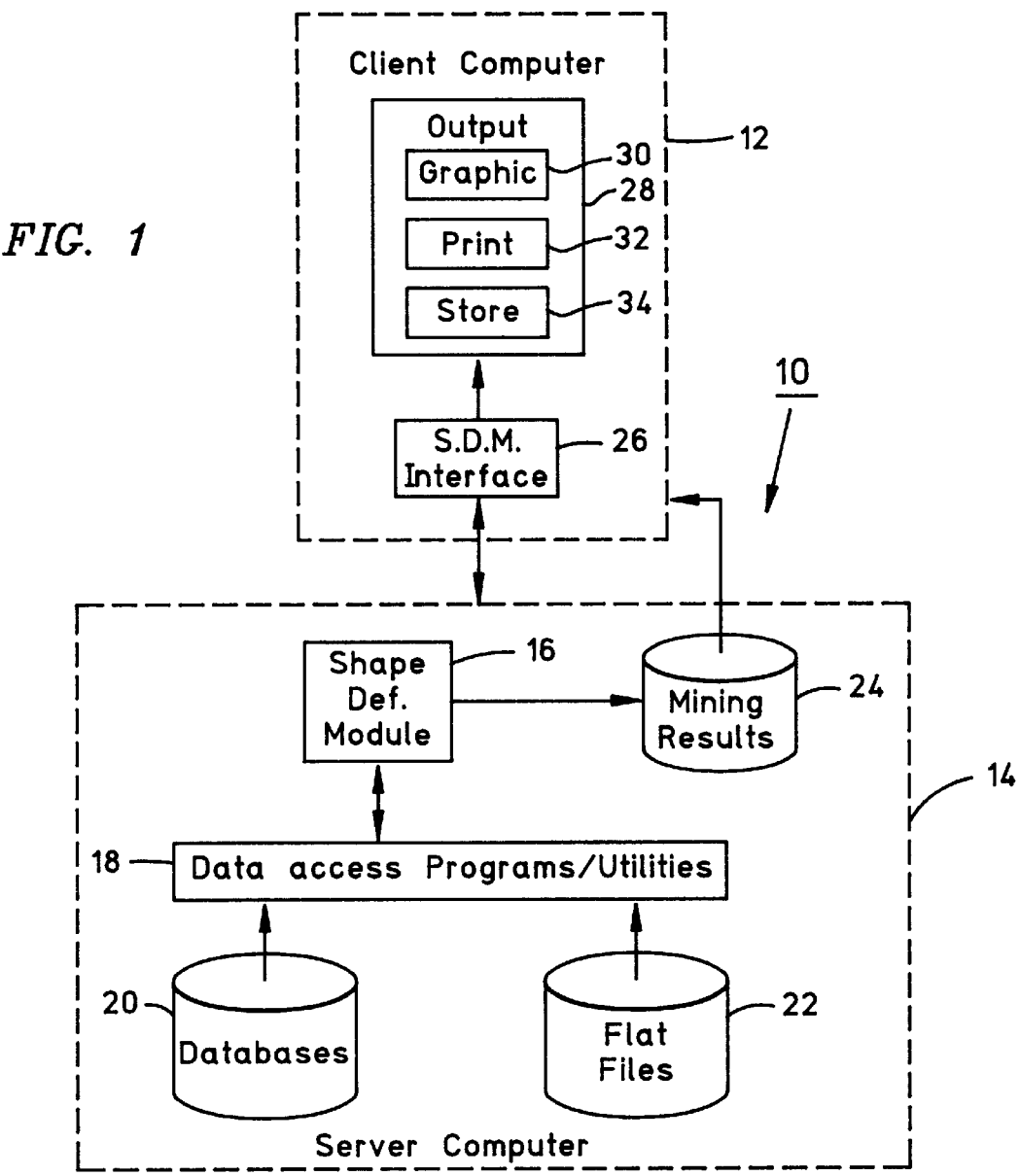
FIG. 1 is a functional block diagram of the system for mining generalized association rules of the present invention.

Referring initially to FIG. 1, a shape definition and identification system with which to define shapes for mining time sequences is shown, generally designated 10. In the particular architecture shown, the system 10 includes one or more digital processing apparatus, such as a client computer 12 and a server computer 14. In one intended embodiment, the server computer 14 may be a mainframe computer made by IBM Corp. of Armonk, N.Y., and use an operating system sold under trademarks such as MVS. Or, the server computer 14 may be a Unix computer, or OS/2 server, or Windows NT server, or IBM RS/6000 250 workstation with 128 MB of main memory running AIX 3.2.5. The server computer 14 may own a database system, such as DB2 or ORACLE, or it may have data on files on some data storage medium such as disk, e.g., a 2 GB SCSI 3.5" drive, or tape. It is to be understood that architectures other than the one shown may be used. For example, the functions of the client computer 12 may be incorporated into the server computer 14, and vice versa.

As shown, the server computer 14 includes a shape definition and locator module 16 which may be accessed by a processor within the server computer 14 to enable user-defined desired shape commands and to enable a series of computer-executable instructions. The shape definition and locator module may reside, for example, in RAM of the computer 14.

Figure 2:
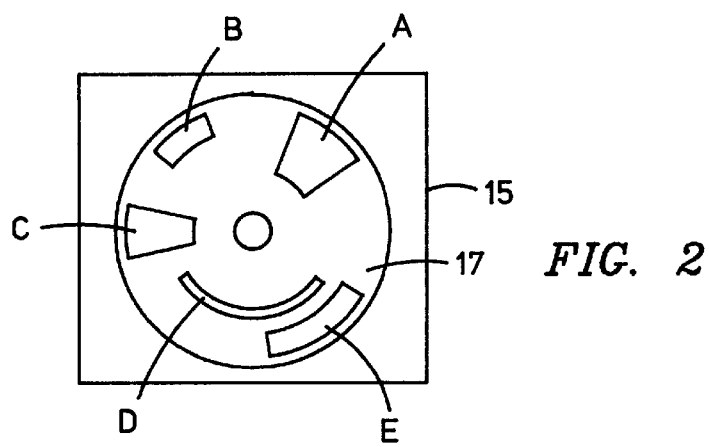
FIG. 2 illustrates a machine component embodying the invention, with portions cut away for illustration.

Alternatively, the shape definition and locator module may be contained on a data storage device with a computer readable medium, such as a computer diskette 15 shown in FIG. 2. Or, the shape definition and locator module may be stored on a DASD array, magnetic tape, conventional hard disk drive, electronic read-only memory, optical storage device, or other appropriate data storage device. In an illustrative embodiment of the invention, computer-executable instructions related to the shape definition and locator module 16 may be lines of compiled $C^{++}$ language code.

Figure 3:
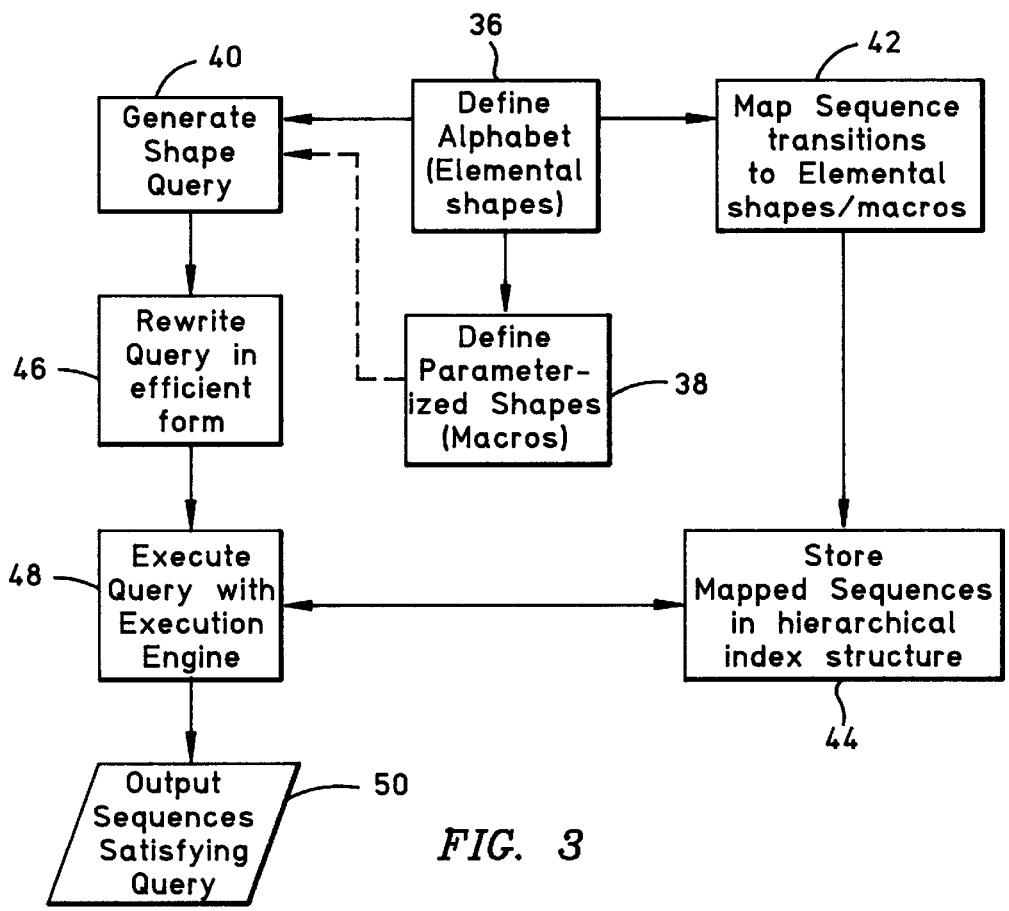
FIG. 3 is a flow chart showing the overall operation of the present invention.

FIG. 3 illustrates the structure of the shape definition and locator module of the present invention as embodied in computer program software. Those skilled in the art will appreciate that FIG. 3 illustrates the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 2 as a combination of program code elements A–E in computer readable form that are embodied in a computer-usable data medium 17, on the computer diskette 15. As mentioned above, however, such media can also be found in semiconductor devices, on magnetic tape, and on optical disks.

FIG. 1 shows that, through appropriate data access programs and utilities 18, the shape definition and locator module 16 accesses one or more databases 20 and/or flat files (i.e., text files) 22 which contain data chronicling transactions. After executing the steps described below, the shape definition and locator module outputs portions (hereinafter "subsequences") of time sequences that satisfy user-defined shape criteria.

Additionally, FIG. 1 shows that the client computer 12 can include a shape definition and locator module interface 26 which may be implemented in suitable computer code. Among other things, the interface 26 can function as an input mechanism for a user to define elemental shapes and desired shapes as discussed in detail below. Further, the client computer 12 preferably includes an output module 28 for outputting and displaying the mining results on a graphic display 30, print mechanism 32, or data storage medium 34.

FIG. 3 shows the overall method of the present invention. Beginning with block 36, the shape definition and locator module 16 of the system 10 provides an elemental shape definer with which a user can define an alphabet of atomic, i.e., elemental, shapes. An example of such an alphabet of elemental shapes is shown in FIG. 4.

As can be appreciated in reference to FIG. 4, the syntax with which a user defines an elemental shape in the presently preferred embodiment is as follows:

(ALPHABET symbol lb ub iv fv), wherein symbol=name of the elemental shape being defined, lb and ub are the lower and upper bounds, respectively, of the allowed variation from the initial value of the shape to the final value of the shape, and iv, fv define the constraints on the magnitudes of the initial and final values, respectively, of the shape. As intended by the preferred embodiment of the present invention, the possible entries for iv, fv are any value, zero, and non-zero.

Accordingly, referring to FIG. 4, an elemental shape "up", which might be described in words as being an elemental shape that describes a slightly increasing (i.e., magnitude slightly positively increasing) transition in a time sequence, would be any transition for which the magnitude of the final value exceeds the magnitude of the initial value by at least 0.05 but no more than 0.19. Also, the initial and final values of the shape "up" can have any values, within the constraints of the parameters lb, ub.

FIG. 4 also shows an example of an elemental shape "Up", which might be described in words as being an elemental shape that describes a highly increasing (i.e., magnitude highly positively increasing) transition in a time sequence. An "Up" sequence would be any transition for which the magnitude of the final value exceeds the magnitude of the initial value by at least 0.20 but no more than 1.0. Also, the initial and final values of the shape "Up" can have any values, within the constraints of the parameters lb, ub.

Additional elemental shapes "down", "Down", "appears", "disappears", "stable", and "zero" are also set forth in FIG. 4 with their respective values for lb, up, iv, and fv established in accordance with principles discussed above and shown in FIG. 4. As shown therein, for example, the "down" and "Down" elemental shapes are shapes for which the magnitude of the final value is slightly less (for "down") or significantly less (for "Down") than the initial value. The elemental shapes "appears" and "disappears" respectively represent shapes starting at a zero value and ending at a higher value or staring at a higher value and ending at a zero value. The elemental shape "stable" represents a shape that is relatively unchanged between the initial and final values, while the elemental shape "zero" represents a shape whose magnitude is zero across the shape. Ambiguities between "zero" and "stable" are resolved at query time in favor of the particular elemental shape requested by the user.

Referring back to FIG. 3, from block 36 the shape definition and locator module 16 of the system 10 can move to block 38 if desired by the user to define parameterized shapes. Essentially, a parameterized shape is a macro combination of elemental shapes. More particularly, the syntax for defining a parameterized shape in the presently preferred embodiment is (SHAPE name(parameters) (descriptor)), wherein name is the user-defined name of the parameterized shape, (parameters) are a potentially empty set of numerical values or shape descriptors which are described below, and (descriptor) is the name of the elemental shape or shapes that define the parameterized shape.

For example, the parameterized shape defined by (SHAPE (spike) ( ) (concat Up up down Down) defines a simple macro shape that is a concatenation of a highly rising Up elemental shape, immediately followed by a more gently rising up elemental shape, immediately followed by a gently decreasing down elemental shape, immediately followed by a highly decreasing Down elemental shape. As another example, a parameterized shape may be defined as:

(shape doublepeak(width ht1 ht2)
(in width (in order spike(ht1 ht1) spike(ht2 ht2))))
wherein "ht1" and "ht2" are spike heights in "ups" that are separated by a "width" n intervals long.

Figure 5:
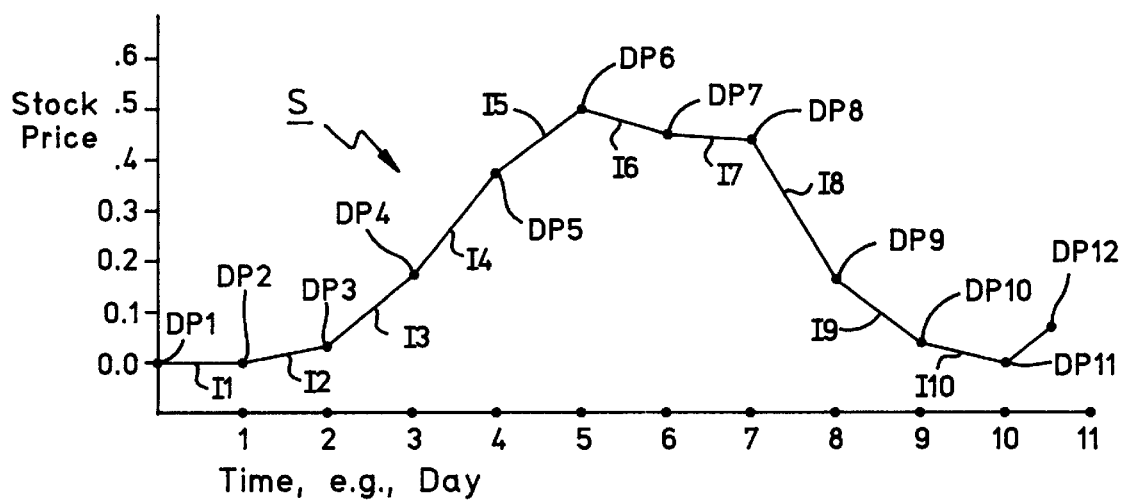
FIG. 5 is a graph showing an example time sequence represented in Cartesian coordinates.

From block 38, the shape definition and locator module 16 of the system 10 proceeds to a shape generator represented by block 40, wherein a shape query is established by a user to define a desired shape as more fully disclosed below. Also, from block 36 the shape definition and locator module 16 of the system 10 proceeds to a mapping element at block 42, wherein transitions in a time sequence, e.g., the time sequence "S" shown in FIG. 5, are mapped to elemental shapes and/or macros (i.e., parameterized shapes) to thereby establish corresponding transition sequences. It is to be understood that no parameterized shapes need be defined by the user at block 38, in which case the shape definition and locator module 16 of the system 10 proceeds to block 40 directly from block 36. It is to be further understood that the alphabet shape definition at block 36 can be undertaken once by a user, and then the operations discussed below that branch from blocks 40 and 42 undertaken a multiplicity of times.

First addressing the process at block 42, cross-reference is made to FIGS. 4 and 5. FIG. 5 shows an example of a time sequence, generally designated S, which is composed of a series of two-dimensional tuples DP1–DP11 and which accordingly can be depicted in Cartesian coordinates as shown. It is to be understood that the principles of the present invention can be applied to tuples having more than two dimensions.

Each tuple DP1–DP1 is characterized by a time and, in the example shown, a magnitude that represents an end-of-trading day price for a particular company stock. Hence, the sequence S is a time sequence. As shown in FIG. 5, the values of DP1–DP11 are normalized to (0 0 0.02 0.17 0.35 0.50 0.45 0.43 0.15 0.03 0). It is to be understood, however, that the magnitude of the sequence S could alternatively represent any one of a number of parameters, e.g., seismic wave activity, weather parameters, machinery operating parameters, etc. that varies over time.

As shown in FIG. 5, intervals I1–I10 are established between successive tuples DP1–DP11. As further shown in FIG. 5, the intervals I1–I10 have the following characteristics:

| Interval | Δ value | iv | fv |
|----------|---------|------|------|
| I1 | 0 | 0 | 0 |
| I2 | +.02 | 0 | .02 |
| I3 | +.15 | .02 | .17 |
| I4 | +.18 | .17 | .35 |
| I5 | +.15 | .35 | .50 |
| I6 | −.05 | .50 | .45 |
| I7 | −.02 | .45 | .43 |
| I8 | −.28 | .43 | .15 |
| I9 | −.12 | .15 | .03 |
| I10 | −.03 | .03 | 0 |

These intervals are mapped to elemental shapes at block 42 using an alphabet of elemental shapes, such as the alphabet shown in FIG. 4 to establish a set of transition sequences which describe the time sequence "S".

Accordingly, after mapping using the alphabet shown in FIG. 4, the sequence "S" shown in FIG. 5 is transformed to the following transition sequences:

(zero appears/stable up up up down stable Down down disappears/stable). As stated above, the ambiguities between appears and stable and between disappears and stable are resolved at query time in favor of the particular elemental shape desired by the user.

From block 42, the shape definition and locator module 16 of the system 10 proceeds to block 44 to store the mapped intervals of the time sequence "S" into a hierarchical index/ storage structure. As intended by the present invention, blocks 42 and 44 together establish a mapping device.

FIG. 6 shows the hierarchical index structure of the presently preferred embodiment. As shown, the index structure has a first, i.e., top, level L1, a second level L2, a third level L3, and a fourth, or bottom, level L4. FIG. 6 shows that each level is an array that includes a plurality of instances $I_{ij}$, wherein i=level number and j=instance number.

It can be appreciated in reference to FIG. 6 that instances $I_{1j}$ in the first level L1 are indexed to the elemental shapes which are defined at block 36 and which appear in one or more of the stored sequence shapes. Further, each instance $I_{1j}$ in the first level L1 points to an instance $I_{2j}$ in the second level L2. Each instance $I_{2j}$ in the second level L2 is a data array indexed by a start period of the first occurrence of the corresponding elemental shape. The size of an array in the second level L2 is equal to np, where np equals the maximum number of time sequence intervals in some time sequence. The dots shown in instances of the second level represent further entries in accordance with the principles discussed above.

Additionally, each instance $I_{2j}$ in the second level L2 points to an instance $I_{3j}$ in the third level L3, and each instance $I_{3j}$ in the third level L3 is a data array indexed to a maximum number of times the corresponding elemental shape appears consecutively. The size of each array in an instance in the third layer L3 which is pointed to from the $k^{th}$ element of a second level L2 array is np-k elements.

Moreover, each instance $I_{3j}$ of the third level L3 points to one or more instances $I_{4j}$ in the fourth level L4, each of which is representative of a transition sequence "H". More specifically, each transition sequence "H" is stored as a series of tuples which include the object identification (referred to herein as "o.id") of the shape "H", including an identification of the time sequence of which the particular shape "H" is a part, and the number of contiguous occurrences of the shape "H" in its associated time sequence. In the exemplar of the present figures, each transition sequence "H" represents a respective one of the intervals I of the sequence "S" shown in FIG. 5.

While FIG. 6 shows that each instance in the third level L3 points to a single transition sequence "H", because the specific exemplary entries shown are for the sequence "S" shown in FIG. 5, it is to be understood that each instance in the third level L3 points to all transition sequences "H" which correspond to time sequences in the database 20 to which the conditions imposed by the appropriate ancestors in the top three levels L1–L3 apply. The entry "NULL" indicates elements corresponding to empty combinations, e.g., when an elemental shape does not start at a specific position in any of the time sequences in the database 20.

When each time sequence interval stored in the database 20 can be mapped to one and only one transition sequence, instances in the first level L1 correspond to elemental shapes. On the other hand, the present invention recognizes that it may happen that one or more time sequence intervals in the database 20 can be mapped to more than one transition sequence. For example, in the exemplary time sequence and elemental shapes shown herein, the time sequence (0 0 0) can be mapped either to (zero zero) or (zero stable).

In the case of large databases, storing all such multiple mappings in the index structure shown in FIG. 6 can result in an exponential growth of the index structure. To avoid this, in applications wherein all elementary shapes are not disjoint from each other, the present invention contemplates breaking down non-disjoint elementary shapes into primitive elementary shapes that are disjoint from each other, and the first level L1 shown in FIG. 6 would then include such primitive elementary shapes.

For example, the shapes "zero" and "stable" could be broken down into three primitive elemental shapes, the first one of which would represent the portion of "zero" which does not overlap with "stable". In such a circumstance, the second primitive elemental shape would represent the portion of "stable" which does not overlap with "zero", while the third primitive elemental shape would represent the overlapping portions of "zero" and "stable". To limit the number of primitive elementary shapes, each primitive elementary shape is associated with an interval of real numbers.

Now addressing in detail the desired shape generation process represented at block 40 of FIG. 3, a user may define a desired time sequence shape for retrieval from the data structure shown in FIG. 6. In defining a desired shape at block 40, the user selectively combines elementary shapes defined at block 36 and parameterized shapes, if any, that are defined at block 38 to generate a desired shape.

The present invention provides a multiplicity of operators for this purpose. The first group of operators that will be discussed are what are termed herein "multiple choice operators" ("MCO"), and the multiple choice operators of the present invention include the operators "any" and "concat". It is to be understood that while the particular syntax of the present invention described herein is simple and straightforward, other syntax may be used within the spirit of the present invention.

At block 40, a user may specify that a desired shape have any one of a number of user-specified shapes by defining the shape to have (any $P_1, P_2, \ldots P_n$) where $P_i$ is a shape descriptor. In other words, as more fully disclosed below the shape definition and locator module 16 of the system 10 can be caused to traverse the index structure shown in FIG. 6 to retrieve all transition sequences having any of the desired shapes $P_i$, by using the "any" operator.

Also at block 40, a user may specify that a desired shape be characterized by a concatenation of any two or more of a number of user-specified shapes by defining the shape to have (concat $P_1, P_2, \ldots P_n$) where $P_i$ is a shape descriptor. In other words, as more fully disclosed below the shape definition and locator module 16 of the system 10 can be caused to traverse the index structure shown in FIG. 6 to retrieve all transition sequences in which a concatenation of strictly contiguous shapes $P_1$–$P_n$ are found, by using the "concat" operator. Thus, the only transition sequences that will be retrieved in response to the "concat" operator are those characterized by the shape $P_1$ which is immediately followed by the shape $P_2$ which is in turn immediately followed in order by the remainder of the shapes, if any, that are specified in the "concat" definition.

In addition to the multiple choice operators discussed above, the present invention provides so-called "multiple occurrence operators" ("MOO") which include the operators "exact", "atleast", and "atmost". More specifically, at block 40, a user may specify that a desired shape have exactly n contiguous occurrences of a shape P by defining the shape to have (exact n P), where n is an integer. In other words, as more fully disclosed below the shape definition and locator module 16 of the system 10 can be caused to traverse the index structure shown in FIG. 6 to retrieve all transition sequences having exactly n contiguous occurrences of a shape P.

As an example, for the time sequence "S" shown in FIG. 5, if a user specified "exact 2 up" the shape definition and locator module 16 of the system 10 would return the null set Φ, because no subsequence of "S" is exactly two intervals in length consisting entirely of "up" elemental shapes which is neither preceded nor followed by an "up" interval.

Additionally, at block 40 a user may specify that a desired shape have at least n contiguous occurrences of a shape P by defining the shape to have (atleast n P), where n is an integer. In other words, as more fully disclosed below the shape definition and locator module 16 of the system 10 can be caused to traverse the index structure shown in FIG. 6 to retrieve all transition sequences having at least n contiguous occurrences of a shape P. Importantly, the "atleast" operator is maximal, in that the shape definition and locator module 16 of the system 10 returns only subsequences which have at least n contiguous occurrences of P and which are neither preceded nor followed by a subsequence that matches P. As an example, for the time sequence "S" shown in FIG. 5, if a user specified "atleast 2 up" the shape definition and locator module 16 of the system 10 would return the answer {S[2,5]} where {S[2,5]}=(0.02 0.17 0.35 0.50).

Still further, at block 40 a user may specify that a desired shape have at most, i.e., no more than, n contiguous occurrences of a shape P by defining the shape to have (atmost n P), where n is an integer. In other words, as more fully disclosed below the shape definition and locator module 16 of the system 10 can be caused to traverse the index structure shown in FIG. 6 to retrieve all transition sequences having at most n contiguous occurrences of a shape P.

As an example, for the time sequence "S" shown in FIG. 5, if a user specified "atmost 2 up" the shape definition and locator module 16 of the system 10 would determine the answer to be $\{[k,k]\}$ where $0 \leq k \leq 1$ or $6 \leq k \leq 10$. This is because the null sequence is matched at those positions of "S" that do not participate in an "up" transition. The other null sequences are not determined to be in the answer because they participate in a sequence of three consecutive up transitions. Consequently, the final answer is a set of null sequences which are not returned in accordance with the present invention. It will be appreciated, however, that allowing a null sequence to match "atmost n P" enables a user to, e.g., specify (concat (at least 2 up)(atmost 1 Down)) and match it to $\{S[2,5]\}$ corresponding to the sequence up up up. Thus, MCO and MOO operators can be combined to define a desired shape at block 40, and as more fully disclosed below, can further be combined with other operators to define relatively complex desired shapes.

In addition to the MCO and MOO operators, the shape definition and locator module 16 of the system 10 includes a bounded occurrence operator ("BOO") "in" and associated shape-occurrence specifiers "precisely", "noless", "nomore" (in a first format) and "inorder" (in a second format) which can appear only with the BOO "in". As discussed more fully below, the BOO facilitate imposing arbitrary conditions on so-called "blurry" matching, wherein a time sequence can be matched to a desired shape despite the time sequence not exactly matching the desired shape.

Specifically, the syntax for effecting blurry matches using the BOO "in" is (in [length] [shape-occurrences]), wherein [length] establishes an integer number of intervals in which a defined number of user-specified shapes occur. The first of two formats the [shape-occurrences] can assume is one of (precisely n P), (noless n Q), and (nomore n R), or a combination thereof using the logical operators "and" and "or". In response, the shape definition and locator module 16 of the system 10 will retrieve all subsequences from the index structure shown in FIG. 6 which are characterized by subsequences [length] long and which contain precisely n shapes P, or no less than n shapes Q, or no more than n shapes R, as appropriate for the particular shape-occurrence specifier used. Importantly, unlike the MOO operators "exact", "atleast" and "atmost", the shape-occurrence specifiers are used only in conjunction with the BOO "in", and unlike the MOO operators the n occurrences of the shape-occurrence specifiers may overlap and need not be contiguous.

As an example, a user may specify (in 5 (and (noless 2 (any up Up))(nomore 1 (any down Down)))). This defines a desired shape five intervals long that is characterized by at least two ups (either "up" or "Up") and at most one down (either "down" or "Down"). When applied to the sequence "S" shown in FIG. 5, the shape definition and locator module 16 of the system 10 will return $\{S[2,7]\}$ corresponding to the transition sequence (up up up down stable). In contrast, $\{S[3,8]\} \equiv$ (up up down stable Down) is not returned because it contains two downs.

The second format of the [shape-occurrences] uses the "inorder" shape occurrence specifier, in which subsequences [length] long contain, in order of specification, a plurality of shapes $P_1, P_2, \ldots P_n$. $P_i$ and $P_{i+1}$ may not overlap, but need not be contiguous.

As an example, a user may specify (in 7(inorder (atleast 2 (any up Up))(in 4((noless 3(any down Down)))))). To match, a sequence shape in the fourth level L4 of the index structure shown in FIG. 6 must be 7 intervals long, and must contain at least two ups followed by a subsequence four intervals long that contains at least three downs. When applied to the sequence "S" shown in FIG. 3, the shape definition and locator module 16 of the system 10 will return $\{S[2,9]\} \equiv$(up up up down stable Down down).

As recognized by the present invention, the user may select a non-optimal way to define a desired shape at block 40 in FIG. 3. For this reason, the shape definition and locator module 16 of the system 10 proceeds to block 46 from block 40, wherein the user's definition of a desired shape (also referred to herein as a "query") may be automatically rewritten by the shape definition and locator module 16, as more fully described below in reference to FIGS. 7A–7C. Then, from block 46 the shape definition and locator module 16 proceeds to block 48 to execute the query, i.e., to identify sets of transition sequences that match the desired transition sequence. Accordingly, block 48 essentially is a query executor, and the operation of block 48 is discussed more fully below in reference to FIGS. 8–13. From block 48, the shape definition and locator module 16 proceeds to output state 50 to cause the output device 28 (FIG. 1) to output sequences that satisfy the user's query, i.e., to output parameters that are representative of transition sequences that match the desired time sequence shape.

Now referring to FIG. 7A, in undertaking the query rewriting step of block 46 in FIG. 3, the shape definition and locator module 16 begins at decision block 52 in FIG. 7A and determines whether the user has defined, for the user's desired time sequence shape, identical shapes inside the "concat" operator. Although for illustration purposes FIGS. 7A–7C are in the form of flow charts in which decisions are made as to the nature of the user's query prior to rewriting the query, it is to be understood that the module 16 need not actually decide the nature of the query prior to rewriting it. Rather, the module 16 need only receive the query and route directly to the appropriate operational step for rewriting the particular query.

If the user has defined, for the user's desired time sequence shape, identical shapes inside the "concat" operator, the module 16 proceeds to block 54 to "fold" the query using the "exact" operator. This rewriting operation may be expressed as follows:

| User Input Query | Rewritten Form |
|---|---|
| concat ($P_1$ $P_2$ $P_2$ ... $P_2$ $P_3$) ↔ | concat ($P_1$ (exact n $P_2$) $P_3$), wherein n = number of occurrences of $P_2$ in the user input query. |

From block 54 or decision block 52 if the test there was negative the module 16 proceeds to decision block 56, wherein the module 16 determines whether first and second MOO, designated $M_1$ and $M_2$, have been composed together. If not, the module 16 proceeds to FIG. 7C. On the other hand, if two MOO have been composed together in the form $M_1$ n ($M_2$ m P), wherein n and m are integers and P is a desired shape, the module 16 proceeds to one of three decision blocks 58, 60, 62 to determine the nature of the composition.

At block 58, the module 16 determines whether the first MOO M, has been composed with "n" number of the second MOO $M_2$ outside the "concat" and "any" operators. If not, the module 16 proceeds with the remaining tests at decision blocks 60 and 62, but otherwise proceeds to decision block 64 to determine whether the first MOO $M_1$ is either "exact" or "atleast". If not (meaning that the first MOO $M_1$ is "atmost"), the module rewrites the input query, at block 66, as "(any(exact 0 ($M_2$ m P))($M_2$ m P))", wherein the shape arguments to "any" in the right hand side correspond to 0 and 1 occurrences of the atmost argument. Then, the module 16 ends at state 68. The rewriting operation at block 66 may be expressed as follows:

| User Input Query | Rewritten Form |
|---|---|
| atmost n ($M_2$ m P) ↔ | (any(exact 0 ($M_2$ m P))($M_2$ m P)) |

In contrast, if the test at decision block 64 is positive, the module 16 rewrites the input query as the null set ϕ at block 70 if n>1, or "$M_2$ m P" if n=1, and then ends at state 68. The rewriting operation at block 70 may be expressed as follows:

| User Input Query | Rewritten Form |
|---|---|
| ({exact \| atleast} n ($M_2$ m P)) ↔ | ($M_2$ m P), n = 1, ϕ, n > 1 |

At decision block 60, the module 16 determines whether the "concat" operator has been applied to the first and second MOO $M_1$, $M_2$. If not, the module 16 proceeds to decision block 62, but if so, the module 16 proceeds to decision block 72, wherein the module 16 determines whether the second MOO $M_2$ is "atmost" or m=0, in which case the module 16 rewrites the input query as $M_2$mP at block 76. Otherwise, the module 16 rewrites the input query as the null set ϕ at block 74, and then ends at state 68. The rewriting operations at blocks 74 and 76 may be expressed as follows:

| User IpDut Query | Rewritten Form |
|---|---|
| (concat ($M_1$ n P)($M_2$ m P)) ↔ | ($M_1$ n P), if ($M_2$ = atmost or m = 0), and ϕ otherwise |

At decision block 62, the module 16 determines whether the "any" operator has been applied to the first and second MOO $M_1$, $M_2$, provided the first and second MOO $M_1$, $M_2$ are equal to each other. If either condition is not met, the module 16 proceeds to FIG. 7B, but if both conditions are met, the module 16 proceeds to blocks 80, 82, and 84. At block 80, if both the first and second MOO are the "exact" operator and the specified number of occurrences for both are equal, the module 16 rewrites the user input query as a single "exact". The rewriting operation at block 80 may be expressed as follows:

| User Input Query | Rewritten Form |
|---|---|
| (any(exact nP)(exact mP)) ↔ | (exact nP), n = m |

At block 82, if both the first and second MOO are the "atleast" operator, the module 16 rewrites the user input query as a single "atleast" specifying the minimum of "n" or "m" as the desired number of occurrences. The rewriting operation at block 82 may be expressed as follows:

| User Input Query | Rewritten Form |
|---|---|
| (any (atleast nP)(atleast mP)) ↔ | (atleast min (n,m) P) |

At block 84, if both the first and second MOO are the "atmost" operator, the module 16 rewrites the user input query as a single "atmost" specifying the maximum of "n" or "m" as the desired number of occurrences. The rewriting operation at block 84 may be expressed as follows:

| User Input Query | Rewritten Form |
|---|---|
| (any (atmost nP)(atmost mP)) ↔ | atmost max (n,m) P |

As shown in FIG. 7A, the module 16 ends from blocks 80, 82, 84.

Now referring to FIG. 7B, at decision block 86 the module 16 determines whether first and second MOO $M_1$, $M_2$ that are different from each other have been specified by the user in any order inside the "any" operator. If not, the module 16 proceeds to FIG. 7C. If the module 16 determines that the first and second MOO $M_1$, $M_2$ have been specified by the user inside the "any" operator, the module 16 proceeds to blocks 88, 90, 92.

At block 88, if the first MOO is the "exact" operator and the second MOO is the "atleast" operator, the module 16 rewrites the user's input query as atleast m P if m≤n, and as atleast n P if n=m−1. The rewriting operation at block 88 may be expressed as follows:

| User Input Query | Rewritten Form |
|---|---|
| (any (exact nP)(atleast mP)) ↔ | atleast mP, m ≦ n, atleast nP, n = m − 1 |

In contrast, at block 90, if the first MOO is the "exact" operator and the second MOO is the "atmost" operator, the module 16 rewrites the user's input query as atmost m P if m≧n, and as atmost n P if m=n−1. The rewriting operation at block 90 may be expressed as follows:

| User Input Query | Rewritten Form |
|---|---|
| (any (exact nP)(atmost mP)) ↔ | atmost mP, m ≧ n, atmost nP, m = n − 1 |

On the other hand, at block 92, if the first MOO is the "atmost" operator and the second MOO is the "atleast" operator, the module 16 rewrites the user's input query as atleast 0 P if m≦n+1. The rewriting operation at block 92 may be expressed as follows:

| User Input Query | Rewritten Form |
|---|---|
| (any (atmost nP)(atleast mP)) ↔ | atleast 0 P, m ≦ n + 1 |

Now referring to FIG. 7C, the module 16 determines whether to rewrite user input queries that use the "in" operator. Stated differently, FIG. 7C shows how the module 16 rewrites user-defined desired shapes which are to be blurry matched with transition sequences in the index structure shown in FIG. 6.

Starting at decision block 94 in FIG. 7C, the module 16 determines whether two shape occurrence specifiers (SOS) have been used in a query inside the BOO "in". If not, the module 16 proceeds to decision block 96, wherein the module 16 determines whether the length specified by the BOO "in" operator is less than the guaranteed minimum length of the transition sequence to be matched, as specified by the numeral immediately following the SOS. If not, the module 16 ends at state 98, but if the length specified by the BOO "in" operator is less than the guaranteed minimum length of the transition sequence to be matched, the module 16 proceeds to block 100 and rewrites the user's query as the null set φ.

On the other hand, if the module 16 determines, at decision block 94, that two shape occurrence specifiers (SOS) have been used in a query inside the BOO "in", the module 16 proceeds to decision block 102. At decision block 102, the module 16 determines whether first and second SOS $S_1$, $S_2$ have been composed together. If so, the module 16 proceeds to block 104 to rewrite the user's query using the principles discussed above in regard to two MOO that are composed together.

If, at decision block 102, the module 16 determines that first and second SOS $S_1$, $S_2$ have not been composed together, the module 16 moves to decision block 106 to determine whether the SOS have been used inside the "and" or "or" operators. If not, the module 16 ends at state 98, but if so, the module 16 rewrites the user's input query in accordance with principles discussed above with regard to MOO.

More specifically, if the SOS have indeed been used inside the "and" operator, the module 16 rewrites the query using the principles discussed above for the case wherein two MOO have been used inside the "concat" operator. And, if the SOS have indeed been used inside the "or" operator, the module 16 rewrites the query using the principles discussed above for the case wherein two MOO have been used inside the "any" operator.

Now referring to FIGS. 8–13, the operation of the query execution engine represented at block 48 in FIG. 3 can be appreciated. As intended by the present invention, the module 16 receives the user-defined desired shape, possibly rewritten as discussed above, and then undertakes the operations shown in FIGS. 8–13, as appropriate, to traverse the index structure shown in FIG. 6 and match transition sequences that are stored therein with the desired shapes. Such index traversal is referred to herein as "evaluation", in that a desired shape is evaluated in terms of the stored transition sequences.

As further intended by the present invention, along with the desired shape configuration, the user also inputs a start point "s" and an end point "e" of an interval to be evaluated. (Note that "s" and "e" also may be computed by the procedure of the invention from the results of previous calculations.) The result of the evaluation command (termed herein "eval") is a set of tuples [o.id, start, length], wherein "o.id" is the object identification retrieved from the bottom level L4 of FIG. 6, "start" is the start period as retrieved during index traversal from the second level L2 of FIG. 6, and "length" is the length of the matched subsequence retrieved from the third level L3 of FIG. 6 during index traversal. Alternatively, for certain desired shapes (e.g., shapes defined by the concat operator), "length" is the combined third level L3 lengths of two or more transition sequences. It is to be further understood that as intended herein, the notation shape[P].start[x].occur[y] means "retrieve object identifiers that have y occurrences of the shape P starting from x".

Beginning at block 110 in FIG. 8, a user may desire to match, i.e., to evaluate, an elemental shape P in the interval having start at "s" and end at "e", and block 110 represents the receiving of the user's evaluate query. Proceeding to block 112, the module 16 addresses the user's query by traversing the index structure shown in FIG. 6 by first entering the top level L1 with the particular elemental shape P as the entering argument. Then, the module 16 traverses the lower levels L2, L3, L4 as appropriate to retrieve o.id's that have a start at some "x" and that have "y" consecutive occurrences, within the constraints of block 114.

Specifically, as shown at block 114, the module 16 retrieves only those o.id's in which the maximum of either "s" or "x" is less than or equal to "i", and "i" is less than the minimum value of either "e" or the sum of "x" and "y". From the index traversal and o.id retrieval steps of blocks 112, 114, the module 16 proceeds to output state 116 to output a set of matching elemental shapes in the form {o.id, start[i], length[1]}. As the skilled artisan will appreciate, the length of the satisfying o.id's is unity, because only a single elemental shape was desired to be evaluated, i.e., matched to subsequences in the index structure of FIG. 6.

The operation of the module 16 in FIG. 8 can be expressed as follows:

eval $(P[s,e])$={[oid:$o$; start:$i$; length:$l$]|∃$x,y$($o$ ∈ shape $P$.start[$x$].occur[$y$]∧ max $(s,x)$≤$i$<min$(x+y,e)$)}

FIG. 9 shows the index traversal of the module 16 to satisfy an "exact" query (at block 118) for "n" occurrences of an elemental shape P, n>0. At block 120, the module 16 undertakes index traversal to retrieve o.id's that have a start at some "x" and that have "y" consecutive occurrences, within the constraints of blocks 122, 124, 126. More particularly, at block 122 "x" is constrained to be no more than the difference between "e" and "n". Also, at block 124 the sum of "s" and "n" is constrained to be no more than the sum of "x" and "y". Additionally, at block 126 the difference between the minimum of either "e" or the sum of "x" and "y" and the maximum of either "s" or "x" is constrained to equal "n". If a particular o.id meets all three of the above criteria, it is output in a set of matching transition sequences at output state 128 as {o.id, start[max (s,x)], length[n]}. It is to be understood that "start[max (s,x)]" indicates that the starting point which is output for an o.id is the maximum of either "s" or "x".

The operation of the module 16 in FIG. 9 can be expressed as follows:

eval (exact $n$ $P[s, e]$) =

{[oid:$o$; start:max $(s, x)$; length:$n$]| ∃$x, y$ ($o$ ∈ shape $P$ · start[$x$] · occur[$y$]∧($x$ ≦ $e − n$)∧($s$ + $n$ ≦ $x + y$)∧(min($e, x$ + $y$) − max($s, x$)) = $n$)}

Now referring to FIG. 10, the index traversal of the module 16 to satisfy an "atmost" query (at block 130) for "n" occurrences of an elemental shape P is shown. At block 132, the module 16 undertakes index traversal to retrieve o.id's that have a start at some "x" and 20 that have "y" consecutive occurrences, within the constraints of blocks 134, 136, 138.

More particularly, at block 134 "x" is constrained to be less than "n". Also, at block 136 "s" is constrained to be less than the sum of "x" and "y". Furthermore, at block 138 the difference between the minimum of either "e" or the sum of "x" and "y" and the maximum of either "s" or "x" is constrained to be no more than "n". If a particular o.id meets all three of the above criteria, it is output in a set of matching transition sequences at output state 140 as {o.id, start[max (s,x)], length[min (e, x+y)–max (s, x)]}. It is to be understood that "length[min (e, x+y)–max (s, x)]" indicates that the length that is output for an o.id is the minimum of either "e" or the sum of "x" and "y" minus the maximum of either s or x.

The operation of the module 16 in FIG. 10 can be expressed as follows:

eval (atmost $n$ P[$s$, $e$]) = {[oid:$o$; start:max ($s$, $x$); length:min($e$, $x + y$) –

$$\max (s, x)] | \exists x, y \ (o \in \text{shape } P \cdot \text{start}[x] \cdot$$

$$\text{occur}[y] \land (x < n) \land (s < x + y) \land (\min(e, x + y) - \max(s, x)) \leq n)\}$$

In addition, the set of matching transition sequences at output state 140 includes the results of "eval exact 0 P[s,e]," which operation is disclosed below in reference to FIG. 12.

FIG. 11 shows the index traversal of the module 16 to satisfy an "atleast" query (at block 142) for "n" occurrences of an elemental shape P is shown. At block 144, the module 16 undertakes index traversal to retrieve o.id's that have a start at some "x" and that have "y" consecutive occurrences, within the constraints of blocks 146, 148, 150.

More particularly, at block 146 "x" is constrained to be less than or equal to "e–n". Also, at block 148 the sum of "s" and "n" is constrained to be no more than the sum of "x" and "y". Furthermore, at block 150 the difference between the minimum of either "e" or the sum of "x" and "y" and the maximum of either "s" or "x" is constrained to be no less than "n". If a particular o.id meets all three of the above criteria, it is output in a set of matching transition sequences at output state 152 as {o.id, start[max (s,x)], length[min (e, x+y)–max (s,x)]}. It is to be understood that the length that is output for an o.id is the difference between the minimum of either "e" or the sum of "x" and "y" and the maximum of either "s" or "x".

From output state 152, the module 16 proceeds to decision block 154, wherein it is determined whether n=0. If not, the module 16 ends at end state 156. Otherwise, the module 16 proceeds to block 158 to union the results of "eval exact 0 P" (FIG. 12) to the set of matching transition sequences that are output at output state 152.

The operation of the module 16 in blocks 142–152 of FIG. 11 can be expressed as follows:

eval (atleast $n$ P[$s$, $e$]) = {[oid:$o$; start:max ($s$, $x$); length:min($e$, $x + y$) –

$$\max(s, x)] | \exists x, y \ (o \in \text{shape } P \cdot \text{start}[x] \cdot$$

$$\text{occur}[y] \land (x \leq e - n) \land (s + n \leq x + y) \land (\min(e, x + y) - \max(s, x) \geq n)\}$$

In reference to FIG. 12, the means by which the module 16 evaluates "eval exact 0 P[s,e]" is shown. From block 160, the module 16 proceeds to block 162 to evaluate the query "eval atleast 1 P[s,e]" using the process shown in FIG. 11. Then, the module 16 outputs a set of matching transition sequences at output state 164 which are those o.id's that are not included in the set of o.id's determined at block 162.

It is to be understood that to evaluate queries using one of the shape occurrence specifiers "precisely", "nomore", and "noless", the module 16 undertakes the operational steps shown in FIGS. 9, 10, and 11, respectively, with the following exceptions. When "nomore" is being evaluated, "n" must be greater than the sum of all P occurrences in [s,e]. Likewise, when "noless" is being evaluated, "n" must be smaller than the sum of all P occurrences in [s,e]. Also, when "precisely" is being evaluated, "n" must be equal to the sum of all P occurrences in [s,e].

When the user desires to evaluate, i.e., match a complex shape (i.e., a shape established by combining two or more elementary shapes) with a transition sequence in the index structure, the above operations are recursively performed as appropriate, and the resulting output sets combined in accordance with principles set forth above. Stated differently, the evaluation of complex shapes is inductively performed using the index structure and steps shown above.

FIG. 13 shows an example of such an inductive evaluation for an input query of "eval concat $D_1$, $D_2$ [s,e]" at block 166, wherein $D_1$ and $D_2$ are first and second complex shapes each of which is composed of elemental shapes "P". At block 168, the index structure is traversed as appropriate to output a first set $S_1$ of o.id's that match the constraints of the first complex shape $D_1$, using the principles discussed above for elemental shapes to inductively determine $S_1$. Then, an interval $I_1$ is determined. As intended by the present invention, the interval $I_1$ is the interval in which the matching of the second complex shape $D_2$ with the first complex shape $D_1$ must begin.

At block 170, the interval $I_1$ is determined to be bounded on one end by the minimum start plus length of an element in the first $S_1$. Moreover, as shown in FIG. 13 the interval $I_1$ is determined to be bounded on its other end by the maximum start plus length of an element in the first set $S_1$.

After determining the interval $I_1$ at block 170, the module 16 moves to block 172 to traverse the index to evaluate the second complex shape $D_2$ using a start "t" that is within the interval $I_1$. A second set $S_2$ is the result of the step at block 172. Next, at block 174, the first and second complex shapes $D_1$, $D_2$ are joined within the predicate constraints of blocks 176 and 178. It is to be understood that the second set $S_2$ is the union of all such evaluation results for each start "t".

More specifically, block 176 requires that, in joining an o.id of the first set $S_1$ with an o.id of the second set $S_2$, the o.id's must match. In other words, to concatenate an element from the first set with an element from the second set, the elements must be derived from the same time sequence.

Furthermore, block 178 requires that the start of the o.id in the second set $S_2$ that is to be matched with an o.id in the first set $S_1$ must equal the start of the first o.id plus the length of the first o.id. Thus, the constraint set forth above in relation to the "concat" operator, namely, that concatenated shapes be contiguous, is preserved. Sets of matches (i.e., joined o.id's) are output at output state 180 with a projection on each match that requires that the start of the match is equal to the start of the o.id from the first set $S_1$ and the length of the match is equal to the sum of the lengths of the joined o.id's.

FIG. 13 shows the steps for concatenating two complex shapes $D_1$ and $D_2$. As stated above, the concatenation of "n" complex shapes is performed inductively. In other words, the first two shapes are concatenated as shown, then the third shape is concatenated to the concatenation of the first two shapes, and so on. The inductive evaluation stops when the result of a join is empty, or when all joins have been performed.

With the above detailed disclosure in mind, the evaluation of other operators may be simply explained in relation to the processes discussed previously. To evaluate the MOO operators as used on complex shapes, the inductive process of FIG. 13 using FIGS. 9–12, as appropriate, is used (recall that, like "concat", the MOO require contiguous, non-overlapping shapes). The exact and atmost operators have the same stopping condition as concat. In keeping with principles discussed above (i.e., that "exact" return sequences containing only exactly the specified number of shapes), the exact operator returns the result of step "n" if the result of step "n+1" is empty, and the null result otherwise.

In further keeping with principles discussed above, the atmost operator returns the result of step "i" if i≦n and the result of step i+1 is empty. In the case of the atleast operator, the inductive evaluation stops when a join returns an empty set. The result of step "i" in such a case is returned if i≧n and the step i+1 returned the empty set.

In addition, other operators may be evaluated in accordance with the principles set forth above. For example, to evaluate the operator "any" as used on $D_1 \ldots D_n$, each $D_i$, 1≦i≦n, is separately evaluated and the answer output as the union of all "eval $D_i$ [s,e]". The evaluation of the operator "and", because it allows gaps and overlaps between shapes inside it, is implemented as a join of the respective sets of subsequences that match the various shapes within the "and" operator. When the "or" operator is applied to two or more desired shapes, the answer is the union of the respective sets of subsequences matching the shapes.

With respect to the "in" operator, the length parameter essentially defines a family of intervals inside [s,e] where matches are to be performed. Consequently, "in" is evaluated as follows:

$$\text{eval}((\text{in } n\ D[s,e]) = \cup_{s \leq i \leq e-n}(\text{eval}(D[i, i+n]))$$

When used inside the "in" operator, as they must be, with complex shapes "D", the precisely, nomore, and noless operators are evaluated as are exact, atmost, and atleast are with regard to complex shapes, with the following exception. Recall that the precisely, nomore, and noless operators allow gaps and overlaps between shapes, unlike exact, atmost, and atleast. Accordingly, the definitions for the interval $I_1$ and the predicate constraints of blocks 176, 178 and projection requirement of output state 180 in FIG. 13 require offsets of at least one time period to allow for this.

Additionally, the "inorder" operator, when used as it must be inside the "in" operator, does not allow overlap but does allow gaps between successive shapes. Consequently, it's evaluation schemata is the same as for "concat", except that the predicate constraints of blocks 176, 178 and projection requirement of output state 180 in FIG. 13 require that the start period of a subsequence be separated from the start period of its immediately preceding subsequence by at least the length of the preceding subsequence.

While the particular system and method for defining shapes with which to mine time sequences as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A method for defining time sequence shape criteria and identifying electronically stored time sequences satisfying the shape criteria, comprising method steps of:

(a) defining a set of elemental shapes;
   (b) defining a desired time sequence shape using the elemental shapes or combinations thereof;
   (c) mapping intervals of a time sequence to corresponding transition sequences, each transition sequence corresponding to one or more elemental shapes or combinations thereof that describe a respective interval of the time sequence;
   (d) identifying one or more transition sequences that match the desired time sequence shape; and
   (e) outputting parameter values representative of the one or more transition sequences that match the desired time sequence shape.

2. The method of claim 1, wherein a transition sequence is identified as matching the desired time sequence shape when the transition sequence satisfies user-defined blurry criteria.

3. The method of claim 2, wherein parameters representative of a transition sequence that matches the desired time sequence shape are output only when the transition sequence is not a proper subset of another transition sequence that matches the desired time sequence shape.

4. The method of claim 2, wherein the desired time sequence shape is defined by a user using a first expression, and the method steps further comprise automatically rewriting the first expression in terms of a second expression relatively more efficient than the first.

5. The method of claim 4, wherein the method steps further comprise storing the transition sequences in a hierarchical index structure, and sets of transition sequences that match the desired time sequence shape are identified by accessing the index structure.

6. The method of claim 5, wherein the index structure includes first, second, third, and fourth levels arranged in a hierarchy and having a plurality of instances, and instances in the first level are indexed to elemental shapes.

7. The method of claim 6, wherein each instance in the first level points to an instance in the second level, and each instance in the second level is a data array indexed by the start period of the first occurrence of the elemental shape.

8. The method of claim 7, wherein each instance in the second level points to an instance in the third level, and each instance in the third level is a data array indexed to a maximum number of times the corresponding elemental shape appears consecutively, and each instance of the third level points to an instance in the fourth level representative of a transition sequence.

9. The method of claim 2, wherein the method steps further comprise defining each elemental shape in terms of a plurality of user-defined parameters.

10. The method of claim 9, wherein the method steps further comprise defining the blurry-defined criteria by establishing a first number of consecutive transition sequences that must contain precisely a second number of at least one elemental shape.

11. The method of claim 9, wherein the method steps further comprise defining the blurry-defined criteria by establishing a first number of consecutive transition sequences that must contain no less than a second number of at least one elemental shape.

12. The method of claim 9, wherein the method steps further comprise defining the blurry-defined criteria by establishing a first number of consecutive transition sequences that must contain no more than a second number of at least one elemental shape.

13. The method of claim 9, wherein the method steps further comprise defining the blurry-defined criteria by establishing a desired time sequence length in which at least a first elemental shape follows in order at least a second elemental shape.

14. The method of claim 9, wherein the method steps further comprise defining the desired time sequence shape as being characterized by any one or more of a number of elemental shapes.

15. The method of claim 9, wherein the method steps further comprise defining the desired time sequence shape as being characterized by a concatenation of any two or more elemental shapes.

16. The method of claim 9, wherein the method steps further comprise defining the desired time sequence shape as being characterized by an exact user-defined number of contiguous non-overlapping occurrences of one or more elemental shapes.

17. The method of claim 9, wherein the method steps further comprise defining the desired time sequence shape as being characterized by no less than a user-defined number of contiguous non-overlapping occurrences of one or more elemental shapes.

18. The method of claim 9, wherein the method steps further comprise defining the desired time sequence shape as being characterized by no more than a user-defined number of contiguous non-overlapping occurrences of one or more elemental shapes.

19. A method for identifying time sequences characterized by one or more transition sequences that conform to one or more user-defined shapes, comprising the method steps of:

defining a plurality of elemental shapes, each elemental shape being characterized by a plurality of user-defined attributes;

defining a desired time sequence shape in terms of the elemental shapes or combinations thereof;

identifying transition sequences that match the desired time sequence shape in accordance with user-defined blurry criteria each transition sequence being defined by one or more elemental shapes and corresponding to an interval of a time sequence; and outputting parameters representative of transition sequences that match the desired time sequence shape.

20. The method of claim 19, further comprising correlating a time sequence to corresponding transition sequences.

21. The method of claim 20, wherein the blurry criteria are established by one or more of:

a first number of consecutive transition sequences that must contain precisely a second number of at least one elemental shape;

a third number of consecutive transition sequences that must contain no less than a fourth number of at least one elemental shape;

a fifth number of consecutive transition sequences that must contain no more than a sixth number of at least one elemental shape; and a user-defined time sequence length in which at least a first elemental shape follows in order at least a second elemental shape.

22. The method of claim 20, wherein the step of defining a desired time sequence shape includes defining the desired time sequence shape as being characterized by any one or more of:

a number of elemental shapes;

a concatenation of any two or more elemental shapes;

an exact user-defined number of contiguous non-overlapping occurrences of one or more elemental shapes;

no less than a user-defined number of contiguous non-overlapping occurrences of one or more elemental shapes; and no more than a user-defined number of contiguous non-overlapping occurrences of one or more elemental shapes.

23. The method of claim 19, wherein:

the outputting step comprises outputting parameters representative of a transition sequence that matches the desired time sequence shape only when the transition sequence is not a proper subset of another transition sequence that matches the desired time sequence shape;

the step of defining a desired time sequence shape includes the steps of defining a shape using a first expression and rewriting the first expression in terms of a second expression relatively more efficient than the first, and the method further comprises storing the transition sequences in a hierarchical index structure, with sets of transition sequences that match the desired time sequence shape being identified by accessing the index structure.

24. The method of claim 23, wherein the index structure includes first, second, third, and fourth levels arranged in a hierarchy and having a plurality of instances, and wherein:

instances in the first level are indexed to elemental shapes;

each instance in the first level points to an instance in the second level, each instance in the second level being a data array indexed by the start period of the first occurrence of the elemental shape;

each instance in the second level points to an instance in the third level, each instance in the third level being a data array indexed to a maximum number of times the corresponding elemental shape appears consecutively, each instance of the third level pointing to an instance in the fourth level representative of a transition sequence.

25. A method for matching time sequences in a database with at least one desired time sequence shape, comprising the method steps of:

(a) defining a set of elemental shapes;

(b) defining the desired time sequence shape using the elemental shapes or combinations thereof;

(c) mapping intervals of a time sequence to corresponding transition sequences, each transition sequence being defined by one or more elemental shapes;

(d) identifying sets of transition sequences that match the desired time sequence shape; and (e) outputting parameters representative of transition sequences that match the desired time sequence shape.

26. The method of claim 25, wherein a transition sequence is identified as matching the desired time sequence shape when the transition sequence satisfies user-defined blurry criteria.

27. The method of claim 26, wherein parameters representative of a transition sequence that matches the desired time sequence shape are output only when the transition sequence is not a proper subset of another transition sequence that matches the desired time sequence shape.

28. The method of claim 26, wherein the desired time sequence shape is defined by a user using a first expression, and the method further comprises automatically rewriting the first expression in terms of a second expression relatively more efficient than the first.

29. The method of claim 26, wherein the method further comprises defining each elemental shape in terms of a plurality of user-defined parameters.

30. The method of claim 29, wherein the method further comprises defining the blurry-defined criteria by establishing one or more of:

a first number of consecutive transition sequences that must contain precisely a second number of at least one elemental shape;

a first number of consecutive transition sequences that must contain no less than a second number of at least one elemental shape;

a first number of consecutive transition sequences that must contain no more than a second number of at least one elemental shape; and a desired time sequence length in which at least a first elemental shape follows in order at least a second elemental shape.

31. The method of claim 30, wherein the method steps further comprise defining the desired time sequence shape as being characterized by any one or more of:

a number of elemental shapes;

a concatenation of any two or more elemental shapes;

an exact user-defined number of contiguous non-overlapping occurrences of one or more elemental shapes;

no less than a user-defined number of contiguous non-overlapping occurrences of one or more elemental shapes; and no more than a user-defined number of contiguous non-overlapping occurrences of one or more elemental shapes.

32. The method of claim 25, wherein the method further comprises storing the transition sequences in a hierarchical index structure, sets of transition sequences that match the desired time sequence shape are identified by accessing the index structure, and wherein the index structure includes:

first, second, third, and fourth levels arranged in a hierarchy and having a plurality of instances, wherein instances in the first level are indexed to elemental shapes, and each index in the first level points to an instance in the second level; and each instance in the second level is a data array indexed by the start period of the first occurrence of the elemental shape; and each instance in the second level points to an instance in the third level; and each instance in the third level is a data array indexed to a maximum number of times the corresponding elemental shape appears consecutively, and each instance of the third level points to an instance in the fourth level representative of a transition sequence.

* * * * *